3,243,443
m-SULFAMIDOBENZYLIDENE-3,3-BIS-4-HYDROXYCOUMARINS
André Allais, Les Lilas, and Pierre Girault, Paris, France, assignors to Roussel-UCLAF, Paris, France, a corporation of France
No Drawing. Filed May 26, 1964, Ser. No. 370,363
Claims priority, application France, June 5, 1963, 937,077; Sept. 5, 1963, 946,680
3 Claims. (Cl. 260—343.2)

The invention relates to novel (m-sulfamidobenzylidene)-3,3'-bis(4-hydroxycoumarin) compounds of the formula

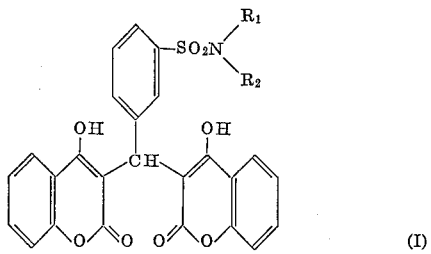

wherein $R_1$ and $R_2$ are selected from the group consisting of hydrogen, an alkyl having 1 to 8 carbon atoms, an aryl and an aralkyl wherein the alkyl has 1 to 4 carbon atoms and their alkali metal salts. The invention also relates to a novel process of their preparation and novel intermediates. The invention further relates to novel uricosuric compositions and to a method of promoting uricosuria.

The said novel compounds of Formula I and their alkali metal salts possess interesting pharmacological properties, particularly uricosuric activity without undesirable side effects. They are useful for the treatment of chronic gout, hyperuricemia, and gouty rheumatism. They can be, in addition, employed during a treatment with penicillin or P.A.S. as adjunctive medication, in hibiting tubulary excertion of these medicines.

It is an object of the invention to provide novel (m-sulfamidobenzylidene)-3,3'-bis-(4 - hydroxycoumarin) of Formula I and their alkali metal salts.

It is another object of the invention to provide a novel process for the preparation of (m-sulfamidobenzylidene)-3,3'-bis - (4 - hydroxycoumarin) of Formula I.

It is a further object of the invention to provide novel uricosuric compositions.

It is an additional object of the invention to promote uricosuria in warm-blooded animals.

These and other objects and advantages of the invention will become obvious from the following detailed description.

The novel (m-sulfamidobenzylidene)-3,3'-bis-(4-hydroxycoumarin) compounds of the invention are selected from the group consisting of compounds of the formula

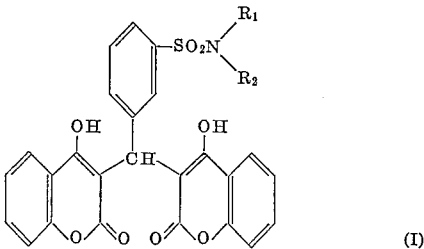

wherein $R_1$ and $R_2$ are selected from the group consisting of hydrogen, an alkyl having 1 to 8 carbon atoms, an aryl and an aralkyl wherein the alkyl has 1 to 4 carbon atoms and their alkali metal salts.

Examples of compounds of Formula I are (m-sulfamidobenzylidene) - 3,3' - bis - (4 - hydroxycoumarin), (m-N-methylsulfamidobenzylidene) - 3,3'-bis-(4-hydroxycoumarin), (m - N,N-diethylsulfamidobenzylidene)-3,3'-bis - (4 - hydroxycoumarin), (m - N-phenylsulfamidobenzylidene) - 3,3' - bis - (4 - hydroxycoumarin), (m - N-benzyl sulfamidobenzylidene) - 3,3' - bis-(4-hydroxycoumarin), (m - N-ethyl-N-benzylsulfamidobenzylidene)-3,3'-bis-(4-hydroxycoumarin); etc.

The novel process of the invention for the preparation of a (m - sulfamidobenzylidene)-3,3'-bis-(4-hydroxycoumarin) of Formula I comprises condensing 4-hydroxycoumarin with a m-sulfamidobenzaldehyde of the formula

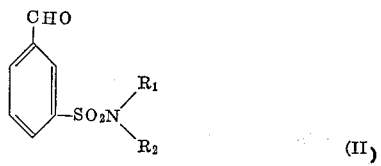

wherein $R_1$ and $R_2$ have the above definitions to obtain the corresponding (m - sulfamidobenzylidene)-3,3'-bis-(4-hydroxycoumarin) which can be reacted with an aqueous solution of an alkali metal hydroxide such as sodium or potassium hydroxide to form the corresponding alkali metal salt. Preferably, the reaction is performed in a hot aqueous media although other solvents may be used.

The meta-sulfamidobenzaldehydes of Formula II which serve as starting materials in the present process, can be prepared starting from a derivative of metatoluenesulfonic acid such as the corresponding acid chloride or amide. In the case of m-sulfamidobenzaldehyde, preferably m-toluenesulfamide is oxidized with chromic acid anhydride inthe presence of a mixture of acetic acid anhydride and acetic acid to form the diacetate of meta-sulfamidobenzaldehyde which by acid hydrolysis furnishes the desired meta-sulfamidobenzaldehyde. For the preparation of substituted m-sulfamidobenzaldehyde such as m-N,N-diethylsulfamidobenzaldehyde, m-toluenesulfochloride is preferably chosen as the starting material, which is oxidized with chromic acid anhydride in the presence of a mixture of acetic acid anhydride and acetic acid into the diacetate of benzaldehyde meta-sulfochloride and the latter compound is then condensed with the desired amine such as diethylamine followed by acid hydrolysis to obtain the desired benzaldehyde such as m-N,N-diethylsulfamidobenzaldehyde.

Examples of suitable amines to be condensed with the diacetate of benzaldehyde meta-sulfochlorides are alkyl amines and dialkyl amines wherein the alkyl radicals have 1 to 8 carbon atoms such as ethyl amine, methyl amine, butyl amine, isoaryl amine, methylethyl amine, dibutyl amine, etc.; aryl amines such as aniline, N-methyl aniline, etc.; aralkyl amines such as benzyl amine, dibenzyl amine, phenethyl amine, N-ethyl benzyl amine, etc.

The novel uricosuric compositions of the invention are comprised of a compound selected from the group consisting of (m-sulfamidobenzylidene)-3,3'-bis-(4-hydroxycoumarins) of the formula

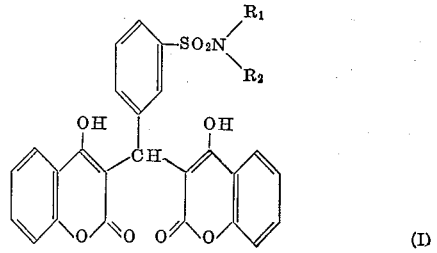

wherein $R_1$ and $R_2$ are selected from the group consisting of hydrogen, an alkyl having 1 to 8 carbon atoms, an aryl and an aralkyl wherein the alkyl has 1 to 4 carbon atoms and their alkali metal salts and a major amount of a pharmaceutical carrier. The said compositions can be prepared in the form of tablets, sugar coated pills, gelatin drops, granules and syrups prepared in the usual manner.

The novel method of promoting uricosuria in warm-blooded animals comprises administering an effective amount of a compound selected from the group consisting of a (m - sulfamidobenzylidene)-3,3'-bis-(4-hydroxycoumarin) of the formula

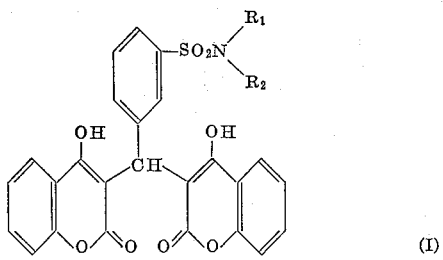

wherein $R_1$ and $R_2$ are selected from the group consisting of hydrogen, an alkyl having 1 to 8 carbon atoms, an aryl and an aralkyl wherein the alkyl has 1 to 4 carbon atoms and their alkali metal salts. The said products may be administered orally and the usual daily dosage is between 500 mg. and 2 gm. in the adult depending upon the therapeutic utilization (uricosuric or adjunctive medication of a treatment with penicillin or P.A.S.).

In the following examples there are described several preferred embodiments to illustrate the invention. However, it should be understood that the invention is not intended to be limited to the specific embodiments.

EXAMPLE I.—PREPARATION OF (META-SULFAMIDOBENZYLIDENE) - 3,3' - BIS - (4 - HYDROXYCOUMARIN)

*Step A: Preparation of meta-sulfamidobenzaldehyde.*—A mixture of 12 gm. of metatoluenesulfamide, 100 cc. of acetic acid and 100 cc. of acetic acid anhydride was cooled to 0° C. and then 17 cc. of 66° Bé. sulfuric acid were added thereto. While maintaining the temperature between +5 and +10° C., 15 gm. of chromic acid anhydride were added and the reaction mixture was agitated for a period of 4 hours at 10° C. Then 100 cc. of benzene and 50 cc. of petroleum ether were added. The organic phases were decanted and the sulfuric acid phase was allowed to flow onto 150 gm. of ice. The solution was iced one hour and the precipitate was vacuum filtered, washed with water and dried to obtain 5 gm. of diacetate of metasulfamidobenzaldehyde. By extraction of the mother liquors with ether, a second yield of 4.6 gm. is obtained. The combined yields of the said diacetate were heated to reflux with 20 cc. of ethanol, 20 cc. of water and 4 cc. of concentrated sulfuric acid for a period of 30 minutes. Thereafter the solution obtained was distilled under vacuum until crystallization commenced. The solution was iced and filtered. The precipitate was vacuum filtered and dried under vacuum to obtain 4.5 gm. of meta-sulfamidobenzaldehyde having a melting point of 126–128° C. which product was used as such for the continuation of the synthesis. It was purified by recrystallization from 5 volumes of isopropanol, then from 20 volumes of water to obtain a product with a melting point of 129–130° C.

The meta-sulfamidobenzaldehyde occurred in the form of colorless platelets soluble in alcohol and acetone, in 20 volumes of water with recrystallization and slightly soluble in ether, benzene and chloroform.

*Analysis.*—$C_7H_7O_3NS$: molecular weight=185.2. Calculated: C, 45.39%; H, 3.81%; N, 7.56%; S, 17.31%. Found: C, 45.4%; H, 4.0%; N, 7.6%; S, 17.1%.

This product is not described in the literature.

The starting compound, meta-toluenesulfamide, was obtained according to the process described by Griffin, J. Am. Chem. Soc., 19, 174 (1897).

*Step B: Preparation of (meta-sulfamidobenzylidene)-3,3'-bis-(4-hydroxycoumarin).*—3 gm. of meta-sulfamidobenzaldehyde and 100 cc. of water were heated to 80° C. while agitating the mixture and then 5.25 gm. of 4-hydroxycoumarin were added while continuing the heating and agitation for a period of two hours. The reaction mixture was then cooled and iced and the residue was vacuum filtered, washed by trituration with water and dried under vacuum. The product was purified by recrystallization from 10 volumes of benzyl alcohol. The precipitate was dissolved in an aqueous alkaline solution and the solution was filtered through carbon black and acidified with hydrochloric acid. The precipitate was vacuum filtered, washed with water and dried under vacuum to obtain 4.5 gm. of (meta-sulfamidobenzylidene)-3,3'-bis-(4-hydroxycoumarin) having a melting point of 293–295° C.

The product occurred in the form of colorless prisms soluble in dilute aqueous alkalis and insoluble in water, alcohol, ether, acetone, benzene and chlorform.

*Analysis.*—$C_{25}H_{17}O_8NS$: molecular weight=491.46. Calculated: C, 61.09%; H, 3.48%; O, 26.04%; N, 2.85%; S, 6.52%. Found: C, 61.1%; H, 3.5%; O, 25.8%; N, 2.7%; S, 6.4.

This product is not described in the literature.

EXAMPLE II. — PREPARATION OF (m - N,N-DIETHYLSULFAMIDOBENZYLIDENE) - 3,3'-BIS-(4-HYDROXYCOUMARIN)

*Step A: Preparation of the diacetate of benzaldehyde meta-sulfochloride.*—25 gm. of meta-toluenesulfochloride were introduced into a mixture of 200 cc. of acetic acid and 200 cc. of acetic anhydride and the mixture was cooled to 0° C. Then, 17 cc. of concentrated sulfuric acid were added very slowly and the temperature was allowed to rise to about 10° C. after which 36.5 gm. of chromic acid anhydride were introduced in the space of one hour. The reaction mixture was allowed to stand under slight cooling for a period of 2 and a half hours and then was poured into iced water and extracted with ether. The extract was washed successively with water, with a solution of sodium bicarbonate and with water, dried and evaporated to dryness to obtain a residue consisting of the raw diacetate of m-sulfochloride benzaldehyde which was utilized as such for the next step.

This compound is not described in the literature.

*Step B: Preparation of m-N,N-diethylsulfamidobenzaldehyde.*—22 gm. of the diacetate of m-sulfochloride benzaldehyde were introduced into 100 cc. of anhydrous benzene and the solution was cooled to about 5° C. Then in a space of an hour and a half, a solution of 16 cc. of diethylamine and 16 cc. of anhydrous benzene were added and the reaction mixture was agitated while cooling slightly for a period of three hours. Then the diethylamine hydrochloride formed was removed by filtration and the benzenic solution was evaporated to dryness to obtain 19.5 gm. of the raw diacetate of m-N,N-diethylsulfamidobenzaldehyde which product was introduced into a mixture of 23 cc. of ethanol, 23 cc. of water and 4.7 cc. of concentrated sulfuric acid. The mixture formed was heated for a period of 30 minutes at reflux and then the alcohol was evaporated under vacuum and the residue was redissolved in either. The ethereal solution was washed with water, with a solution of sodium bicarbonate and again with water; dried and evaporated to dryness under vacuum to obtain 12 gm. of m-N,N-diethylsulfamidobenzaldehyde which crystallized at the end of several days into white prisms having a melting point of 60° C. and a boiling point of 183 to 185° C. at 2 mm. Hg.

This product is not described in the literature.

*Step C: Preparation of (meta-N,N-diethylsulfamidobenzylidene) - 3,3' - bis-(4-hydroxycoumarin).*—Using the procedure of Step B of Example I, m-N,N-diethylsulfamidobenzaldehyde was condensed with 4-hydroxycoumarin to obtain a 50 to 60% yield of (m-N,N-diethylsulfamidobenzylidene)-3,3'-bis-(4-hydroxycoumarin) having a melting point of 221°±1° C.

The product occurred in the form of white prismatic crystals slightly soluble in alcohol, insoluble in water and ether and fairly soluble in acetone and benzene.

*Analysis.*—$C_{29}H_{25}O_8SN$: molecular weight=547.56. Calculated: C, 63.60%; H, 4.60%; S, 5.85%; N, 2.55%. Found: C, 63.6%; H, 4.6%; S, 5.8%; N, 2.6%.

This compound is not described in the literature.

*Pharmacological study*

*I. Uricosuric activity.*—This activity is determined in the rat by performing the test of the retention of P.S.P. (phenolsulfonephthaleine). Following to various works and particularly those of Burns et al. (J. of Pharm. Exp. Ther., 119, 418, 1957), Kuffel (Medecina Experimentalis, 1, 285, 1959) and Scarborough et al. (J. Med. & Pharm. Chim., 5, 175, 1962) this test has become to be considered in effect as a test for the ventual uricosuric action of a product. These authors have shown that there exists a certain parallel between the inhibition of the tubular reabsorption of uric acid and the inhibition of the tubular secretion of P.S.P. entrained by certain products utilized therapeutically as uricosurics such as probenecid. They have, on the other hand, shown that these products exercise the same inhibitory action to P.S.P. in the rat from whence the possibility of profiting from this test of the retention of P.S.P. in order to pharmacologically test uricosurics in allantotelic animals.

The action of (m-sulfamidobenzylidene)-3,3'-bis-(4-hydroxycoumarin) on the retention of P.S.P was compared to that of phenylbutazone and the probenecid. The tests were effected on rats weighing 150 to 200 gm. and the products were administered (a) by subcutaneous method, 30 minutes before the injunction of P.S.P., (b) or by oral method (gastric tube), 120 or 180 minutes before the injection of P.S.P. The P.S.P. utilized in aqueous bicarbonate solution was injected intravenously at a dose of 75 m./kg. to animals which had been anesthesized intraperitoneally 15 minutes before the injection of the P.S.P. (They received 0.4 cc. per kg. of a solution of allyl isopropyl malonylurea at a concentration of 0.1 gm./cc. and a diethyl malonylurea at a concentration of 0.1 mg./cc.)

The plasmatic P.S.P. was determined spectrophotometrically on blood samples taken from the ophthalmic plexus 10, 30 and 60 minutes after its administration. (Samples of about 0.2 cc. of blood were recovered in a heparinated microtube.) For the oral method, the products were placed in suspension in gum syrup diluted in half. For the subcutaneous injection, phenylbutazone was utilized in a specialized injectable form (Geigy). (Meta - sulfamildobenzylidene) - 3,3' - bis-(4-hydroxycoumarin) was utilized in solution in 0.1 N sodium hydroxide solution after adjustment to a pH of 9. Table I gives the results obtained after subcutaneous administration.

TABLE I
[Retention of P.S.P. in the Rat]

| Time in minutes after administration of the product | 40 | 60 | 90 |
|---|---|---|---|
| Time in minutes after injection of P.S.P., 75 mg./kg. | 10 | 30 | 60 |
| Phenylbutazone, 100 mg./kg. | | +32% | +87% |
| (Metasulfamidobenzylidene)-3,3'-bis-(4-hydroxycoumarin), 50 mg./kg. | +16% | +70% | +124% |
| (Metasulfamidobenzylidene)-3,3'-bis-(4-hydroxycoumarin), 100 mg./kg. | +26.5% | +85.5% | +175% |
| (Metasulfamidobenzylidene)-3,3'-bis-(4-hydroxycoumarin), 200 mg./kg. | +27% | +114% | +440% |

Table II gives the results obtained after oral administration.

TABLE II
[Retention of P.S.P. in the Rat]

| Time in minutes after administration of the product | 130 | 150 | 180 | 190 | 210 | 240 |
|---|---|---|---|---|---|---|
| Time in minutes after injection of P.S.P., 75 mg./kg. | 10 | 30 | 60 | 10 | 30 | 60 |
| Phenylbutazone, 250 mg./kg. | | +11.5% | +48% | | | |
| Probenecid, 100 mg./kg. | | | | +14.7% | +57% | +79% |
| (Metasulfamidobenzylidene)-3,3'-bis-(4-hydroxycoumarin), 100 mg./kg. | | | | +9.6% | +48.5% | +70% |

It can be seen from the above tables that (metasufamidobenzylidene)-3,3'-bis-(4-hydroxycoumarin) injected subcutaneously at a dose of 50 mg./kg. is clearly more active than phenylbutazone injected at a dose of 100 mg./kg. Orally, the product is almost as active as probenecid and clearly more active than phenylbutazone.

*II. Test for Undesired Side Effects.*—

(a) *Action on glycemia*: (Metasulfamidobenzylidene)-3,3'-bis-(4-hydroxycoumarin) administered at a dose of 100 mg./kg. orally to a group of rats was without action on glycemia as can be seen from Table III.

TABLE III

| Glycemia | Glucose, gm./liter |
|---|---|
| Before treatment | 0.81 |
| 3 hrs. after treatment | 0.92 |
| 6 hrs. after treatment | 0.94 |

(b) *Amount of sodium in the serum*: (Metasulfamidobenzylidene)-3,3'-bis-(4-hydroxycoumarin) administered for a period of 10 days at a dose of 100 mg./kg. orally to groups of rats never modified the sodium value of the serum as can be seeen from Table IV.

TABLE IV

| | Amount of Sodium in the Serum, gm./liter |
|---|---|
| Controls | 3.18 |
| Treated | 3.16 |

(c) *Time of coagulation of the blood*: The time of prothrombine (Quick time) was determined by the micromethod of Soulier. A sample of 3 drops of blood from the marginal vein of the ear of the rabbit was deposited on a microscope slide. One drop of aqueous suspension of thromboplastine was added to each drop of the blood and the time for coagulation at room temperature was determined. The average of the times observed for the three drops was reported as the time of coagulation of the blood of the animal tested. In a normal rabbit, this time was from 30 to 40 seconds. (m-Sulfamidobenzylidene)-3,3'-bis-(4-hydroxycoumarin) utilized in aqueous suspension was administered orally at a single dose of 50 mg./kg. to a group of male rabbits of 3 kg. A group of control rabbits received distilled water. The Quick time was determined before the treatment, then 1, 2 and 3 days after. The results in Table V were obtained:

TABLE V

|  | Quick time in Seconds | | | |
| --- | --- | --- | --- | --- |
|  | Day 0 | Day 1 | Day 2 | Day 3 |
| Controls | 38 | 38 | 40 | 51 |
| Treated | 36 | 43 | 43 | 48 |

(Meta - sulfamidobenzylidene) - 3,3'-bis - (4 - hydroxycoumarin) thus has no effect on the time of coagulation of the blood at a dose of 50 mg./kg. orally.

*III. Determination of toxicity.*—(Meta-sulfamidobenzylidine-3,3'-bis-(4-hydroxycoumarin), utilized in aqueous suspension at a concentration of 50 mg./cc., was administered orally to three groups of mice of the Rockland strain weighing from 18 to 22 gm. at doses of 500 mg., 1 gm. and 1.5 gm./kg. (volumes administered 0.01, 0.02 and 0.03 cc. per gram of body weight, respectively). The animals were held under observation for a period of 7 days and they presented but a slight state of excitation at everyone of the three dosages, the product presents no toxic effect until the dose of 1.5 gm./kg.

Various modifications of the process and compositions of the invention may be made without departing from the spirit or scope thereof and it is to be understood that the invention is to be limited only as defined in the appended claims.

We claim:
1. A compound selected from the group consisting of (m-sulfamidobenzylidene)-3,3'-bis-(4-hydroxycoumarins) of the formula

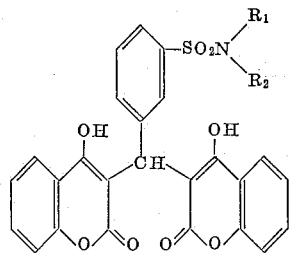

wherein $R_1$ and $R_2$ are selected from the group consisting of hydrogen, alkyl having 1 to 8 carbon atoms, phenyl and phenylalkyl wherein the alkyl has 1 to 4 carbon atoms and their alkali metal salts.

2. (m - Sulfamidobenzylidene) - 3,3' - bis - (4 - hydroxycoumarin).

3. (m - N,N - diethylsulfamidobenzylidene) - 3,3' - bis-(4-hydroxycoumarin).

References Cited by the Examiner
UNITED STATES PATENTS

| 2,345,635 | 3/1944 | Stahmann et al. | 260—343.2 |
| 2,928,768 | 3/1960 | Freedman et al. | 167—65 |

FOREIGN PATENTS

| 580,084 | 8/1946 | Great Britain. |

WALTER A. MODANCE, *Primary Examiner.*

JAMES A. PATTEN, *Assistant Examiner.*